(12) United States Patent
Li et al.

(10) Patent No.: US 7,336,259 B2
(45) Date of Patent: Feb. 26, 2008

(54) RECHARGEABLE WIRELESS INPUT DEVICE

(75) Inventors: Tsu-Nan Li, Taipei County (TW); Wei-Chung Wang, Taipei County (TW); Yu-Wen Tseng, Taipei County (TW)

(73) Assignee: KYE Systems Corp. (TW)

( * ) Notice: Subject to any disclaimer, the term of this patent is extended or adjusted under 35 U.S.C. 154(b) by 465 days.

(21) Appl. No.: 11/103,992

(22) Filed: Apr. 11, 2005

(65) Prior Publication Data

US 2006/0229111 A1   Oct. 12, 2006

(51) Int. Cl.
*H04B 1/38* (2006.01)
*H04M 1/00* (2006.01)

(52) U.S. Cl. .................. 345/163; 455/557; 455/573; 345/163

(58) Field of Classification Search ........ 455/571–573, 455/557–559; 345/163
See application file for complete search history.

(56) References Cited

U.S. PATENT DOCUMENTS

| 6,801,967 | B2 * | 10/2004 | Nakamura et al. ............ 710/62 |
| 6,992,462 | B1 * | 1/2006 | Hussaini et al. ............ 320/114 |
| 7,200,765 | B2 * | 4/2007 | Skurdal et al. ............ 713/323 |
| 2004/0183502 | A1 * | 9/2004 | Cheng ........................ 320/108 |
| 2004/0196262 | A1 * | 10/2004 | Poltorak ..................... 345/163 |
| 2005/0168438 | A1 * | 8/2005 | Casebolt et al. ............ 345/156 |
| 2007/0030248 | A1 * | 2/2007 | Chen et al. ................. 345/163 |

* cited by examiner

*Primary Examiner*—Simon Nguyen
(74) *Attorney, Agent, or Firm*—Raymond Sun

(57) ABSTRACT

An input device has a body and a battery that is retained in the body. A receiver is coupled to a computer via a cable, with the body removably engaging the receiver. The computer delivers power through the cable and the receiver to charge the battery, while the input device simultaneously transmits operational signals to the receiver for further transmission to the computer.

17 Claims, 7 Drawing Sheets

RECHARGEABLE WIRELESS INPUT DEVICE

BACKGROUND OF THE INVENTION

1. Field of the Invention

The present invention relates to a wireless input device, and in particular, to a rechargeable wireless input device.

2. Description of the Prior Art

Wireless input devices, such as computer mice, keyboards, game controllers and the like, are becoming more popular. However, the limited power supplied from the batteries used to power these wireless devices is a serious problem that limits the effectiveness of these wireless devices.

SUMMARY OF THE DISCLOSURE

It is an object of the present invention to provide a rechargeable wireless input device which can be operated even when the battery is being charged.

It is another object of the present invention to provide a rechargeable wireless input device that incorporates a wireless receiver.

In order to accomplish the objects of the present invention, the present invention provides an assembly that includes an input device having a body and a battery that is retained in the body. The assembly also includes a receiver coupled to a computer via a cable, with the body removably engaging the receiver. The computer delivers power through the cable and the receiver to charge the battery, while the input device simultaneously transmits operational signals to the receiver for further transmission to the computer.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
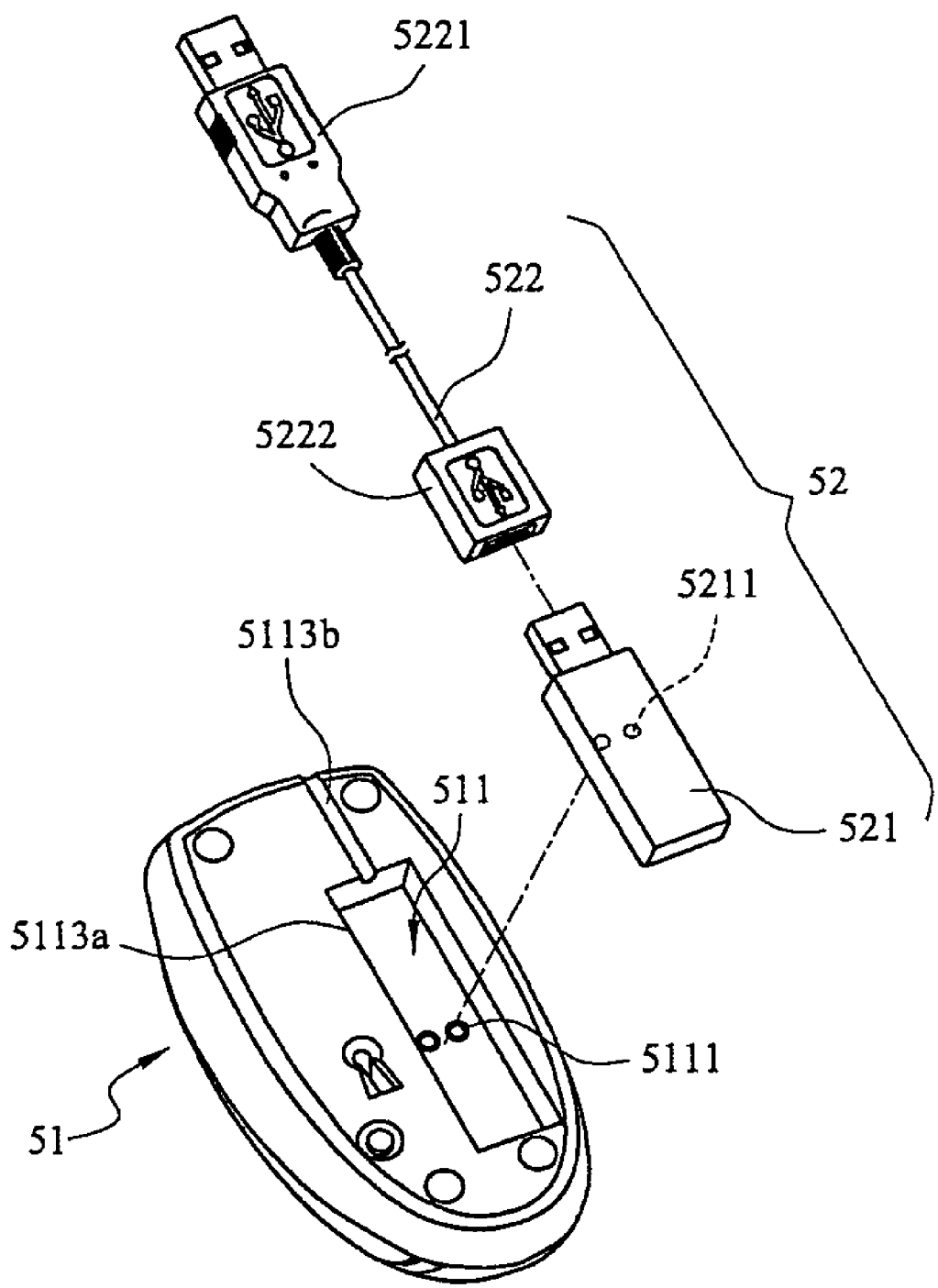
FIG. 1 is an exploded bottom perspective view of an input device according to one embodiment of the present invention.
Figure 2:
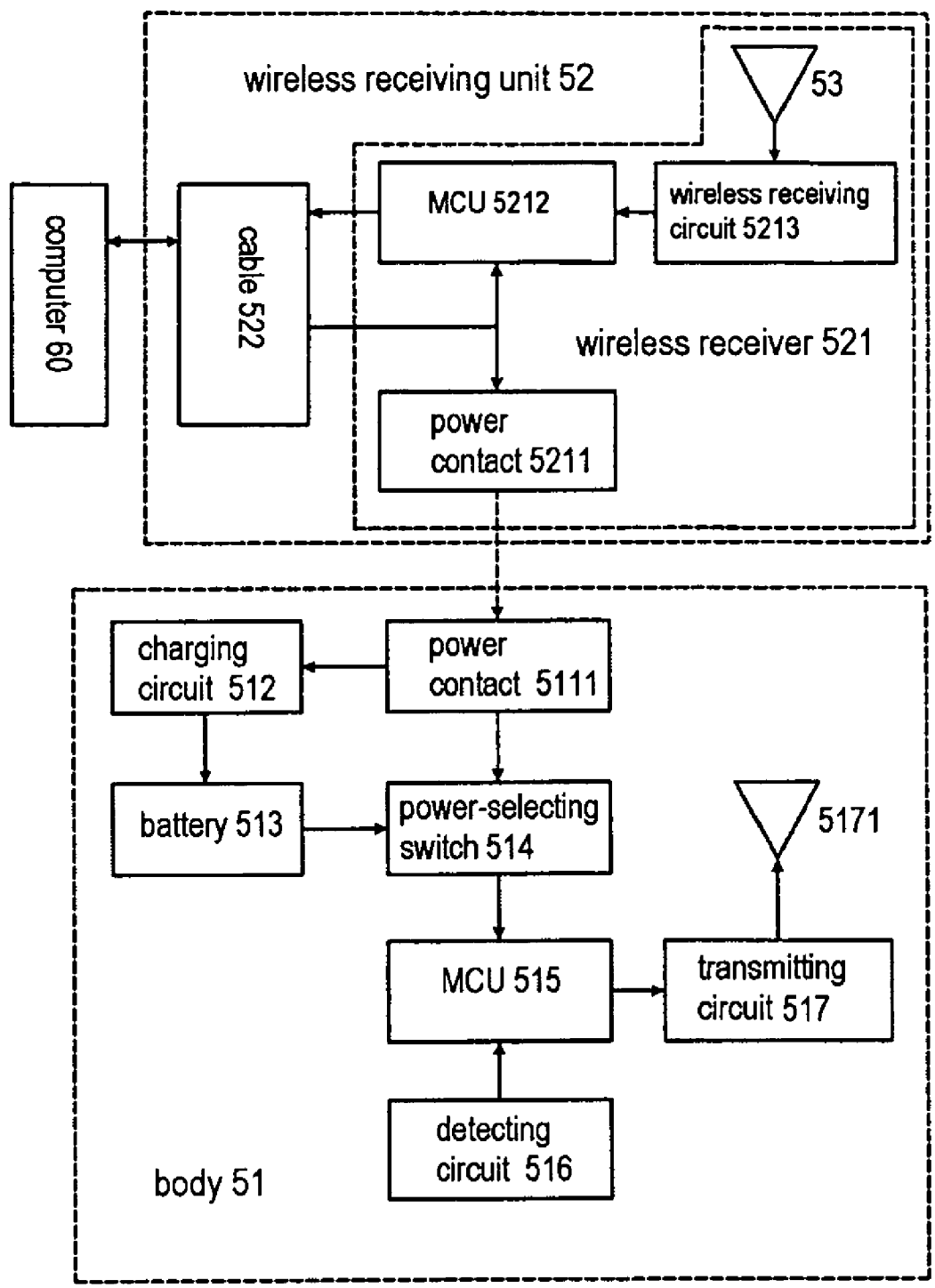
FIG. 2 is a schematic block diagram illustrating the electrical components of the body and the wireless receiving unit of the input device of FIG. 1.

FIGS. 1 and 2 illustrate a first embodiment of a wireless input device according to the present invention. The input device, which can be a computer mouse, has a body 51 and a wireless receiving unit 52. The body 51 has a recess 511 which includes power contacts 5111, a cable retainer 5113b, and a connector retainer 5113a. In addition, a charging circuit 512, a rechargeable battery 513, a power selecting switch 514, a micro control unit (MCU) 515, a detecting circuit 616 and a wireless transmitting circuit 517 are housed in the body 51. FIG. 2 illustrates the interconnections between the contacts 5111, the charging circuit 512, the rechargeable battery 513, the power selecting switch 514, the micro control unit (MCU) 515, the detecting circuit 616 and the wireless transmitting circuit 517.

The power received by the contacts 5111 will enable the charging circuit 512 to recharge the battery 513. The detecting circuit 516 can receive signals, such as coordinate detecting signals, buttons signals, or roller signals, from the movement and control of the input device. The MCU 515 will forward the received signals to the wireless transmitting circuit 517, and the received signals will be wirelessly transmitted via an antenna 5171 to a wireless receiver 521, as shown in FIG. 3.

Figure 3:
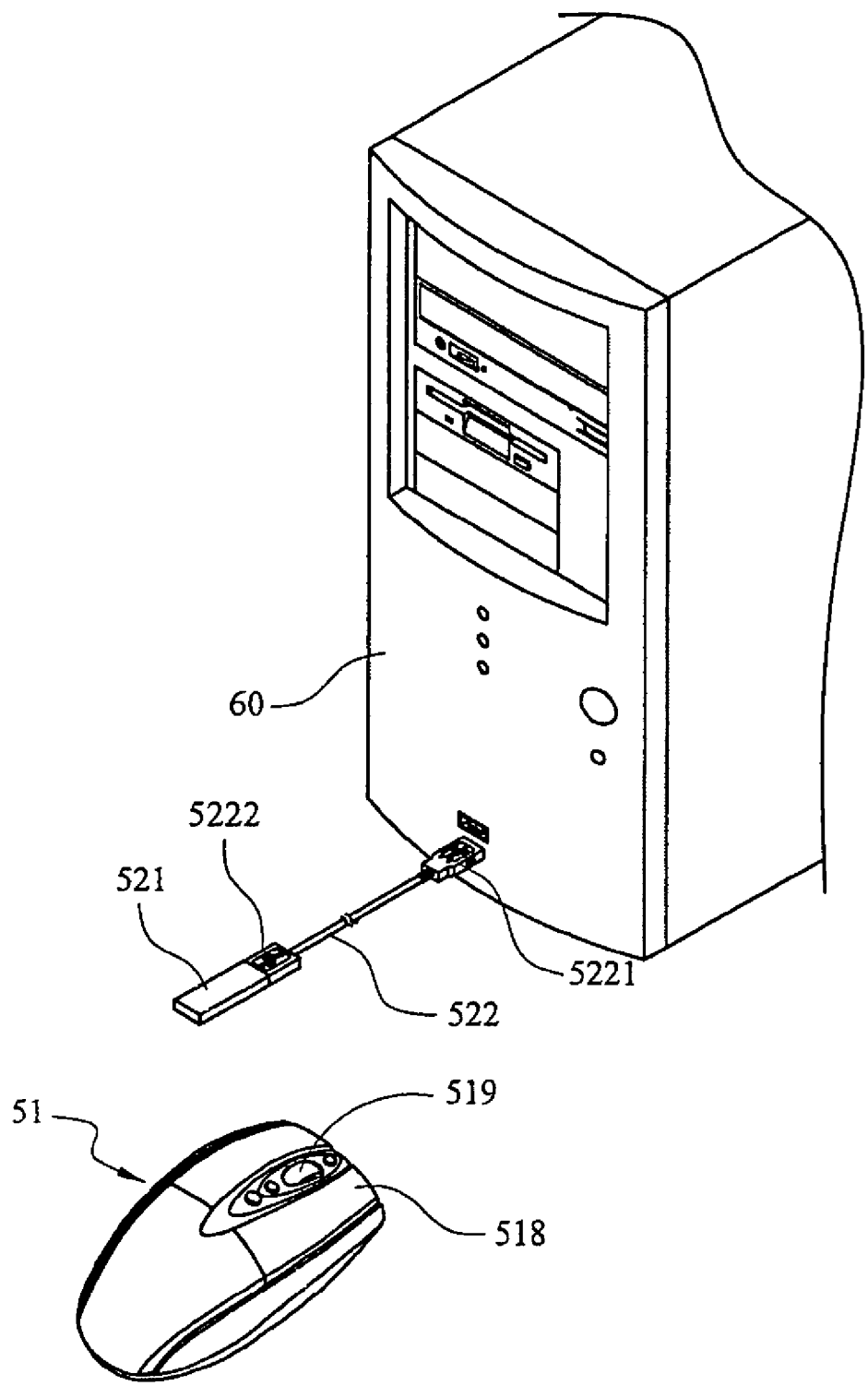
FIG. 3 is an exploded perspective view illustrating the use of the input device of FIG. 1 with a computer.
Figure 4:
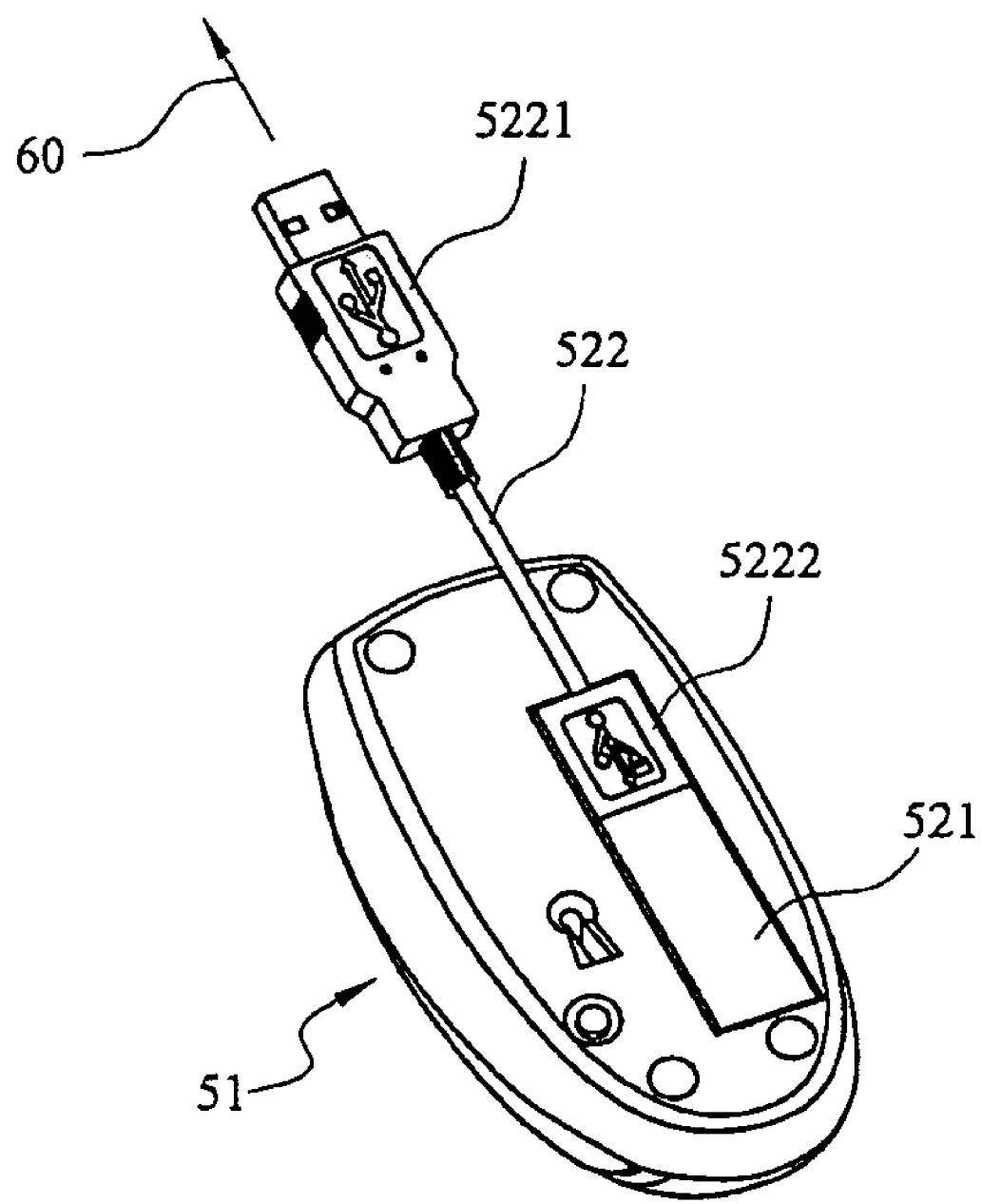
FIG. 4 is an assembled bottom perspective view of the input device of FIG. 1.

Referring to FIGS. 1 and 3, the wireless receiving unit 52 has wireless receiver 521 and a cable 522. The cable 522 has a first connector 5221 for coupling to a port of a computer 60, and a second connector 5222 for coupling to the wireless receiver 521. Referring to FIG. 4, the connector retainer 5113a is adapted to receive the second connector 5222 while the cable connector retainer 5113b is adapted to receive the body of the cable 522. The specification of the first connector 5221 and the second connector 5222 can be, but is not limited to, a USB (universe serial bus) type connector.

Referring to FIGS. 1 and 2, the receiver 521 has power contacts 5211 which correspond to the power contacts 5111, and which are adapted to engage the power contacts 5111 when the receiver 521 is seated in the recess 511. The receiver 521 also has a micro control unit (MCU) 5212 and a wireless receiving circuit 5213. FIG. 2 illustrates the interconnections between the cable 522, the contacts 5211, the MCU 5212, and the wireless receiving circuit 5213. The first connector 5221 couples the computer 60 and the second connector 5222 couples the receiver 521, with the receiver 521 being powered by the computer 60. In addition, the wireless signal emitted by the body 51 will be wirelessly transmitted to the wireless receiving circuit 5213 of the wireless receiver 521 via an antenna 53. The received wireless signal is then transmitted by the wireless receiving circuit 5213 to the MCU 5212, which forwards the received wireless signal to the computer 60 via the cable 522. During this operation, the battery 513 will power the MCU 515, the detecting circuit 516 and the transmitting circuit 517 in the body 51 through the power selecting switch 514.

As an alternative, the receiver 521 can also be coupled directly to the computer 60 (instead of being-coupled to the recess 511) and still receive the wireless signal emitted from the body 51.

Referring to FIGS. 2 and 4, once the receiving unit 52 is placed into the recess 511, the power contacts 5211 will engage the power contacts 5111. Therefore, power from the computer 60 will be transmitted through the cable 522, the power contacts 5211, and the power contacts 5111 to the charging circuit 512 so as to recharge the battery 513. In addition, the power from the computer 60 received via the power contacts 5111 can also directly power the MCU 515, the detecting circuit 516, and the transmitting circuit 517 through the power-selecting switch 514.

The power selecting switch 514 selects the source of the power used to power the MCU 515, the detecting circuit 516, and the transmitting circuit 517. When the battery 513 is being recharged, the power-selecting switch 514 will direct the power from the computer 60 received via the power contacts 5111 directly to the MCU 515, the detecting circuit 516, and the transmitting circuit 517. When the battery 513 is not being recharged, the power-selecting switch 514 will direct the power from the battery 513 to the MCU 515, the detecting circuit 516, and the transmitting circuit 517.

In other words, the battery 513 is recharged through the cable 522 that is coupled to the computer 60, and the signals received by the detecting circuit 516 can be wirelessly transmitted to the receiver 521 while the receiver 521 is retained within the recess 511 of the body 51. Therefore, the battery 513 can be recharged while the user is simultaneously operating the input device.

Figure 5:
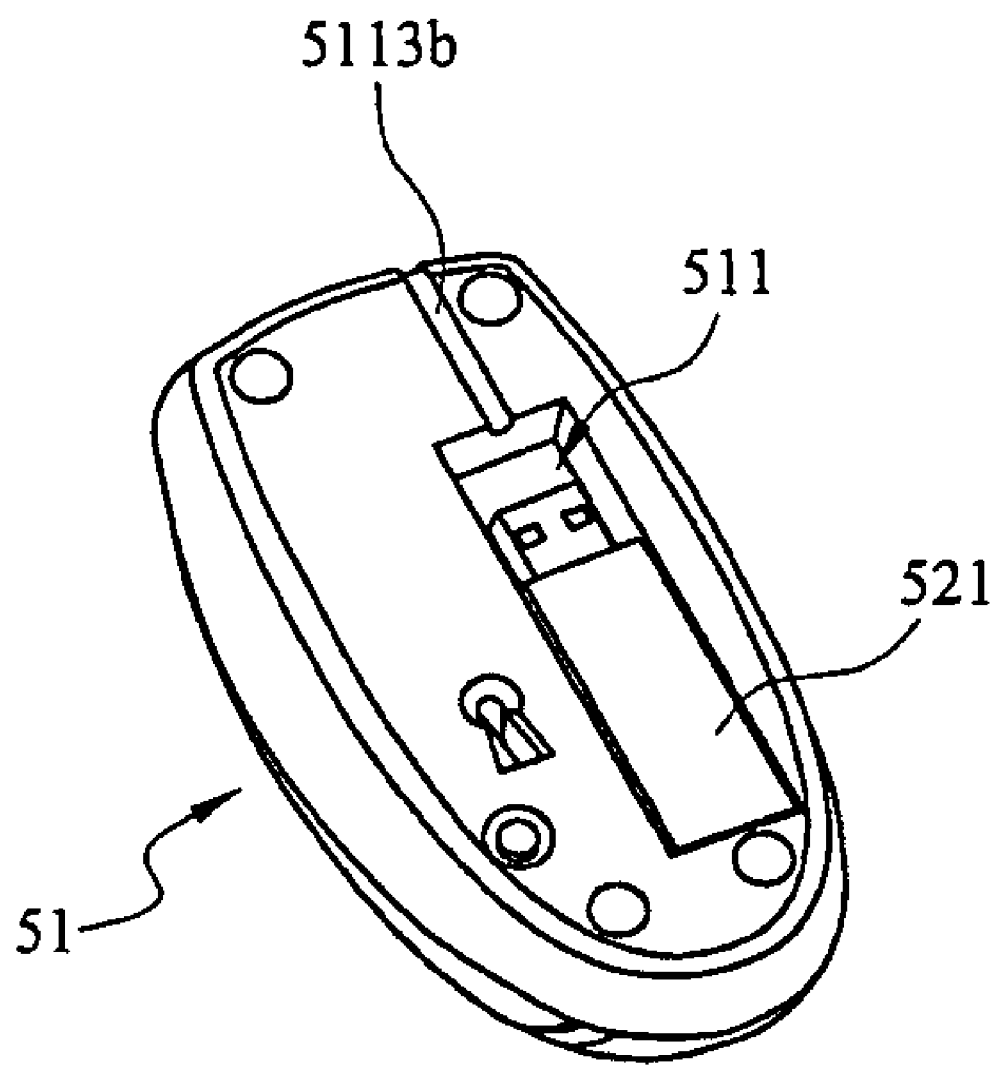
FIG. 5 is an bottom perspective view of the input device of FIG. 1 shown with the receiver positioned inside the recess of the body.

Referring to FIG. 5, the receiver 521 can be placed alone (without the cable 522) within the recess 511 when the user wishes to bring the wireless input device to another working environment.

Figure 6:
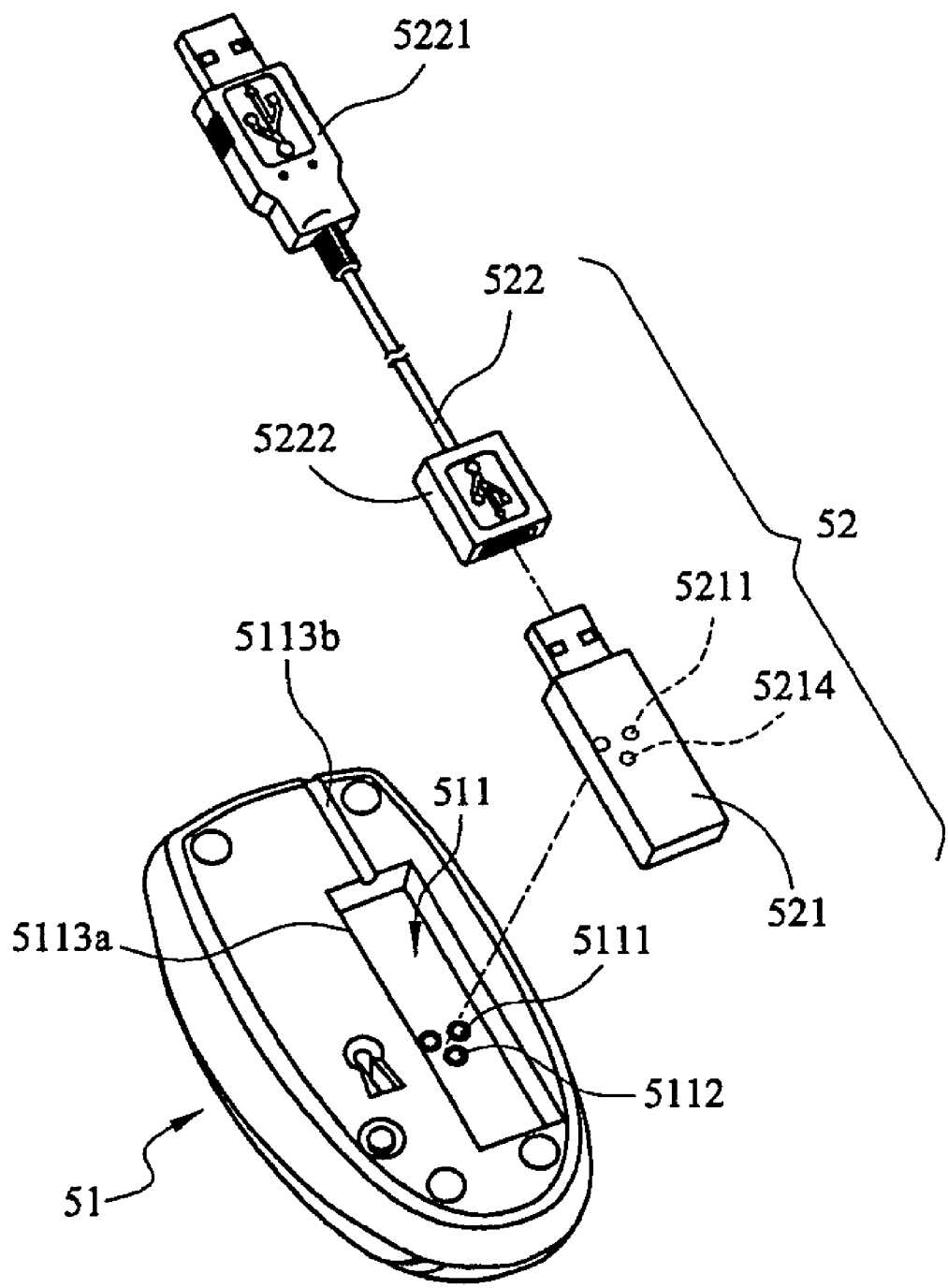
FIG. 6 is an exploded bottom perspective view of the input device of FIG. 1 illustrating a modification made thereto.
Figure 7:
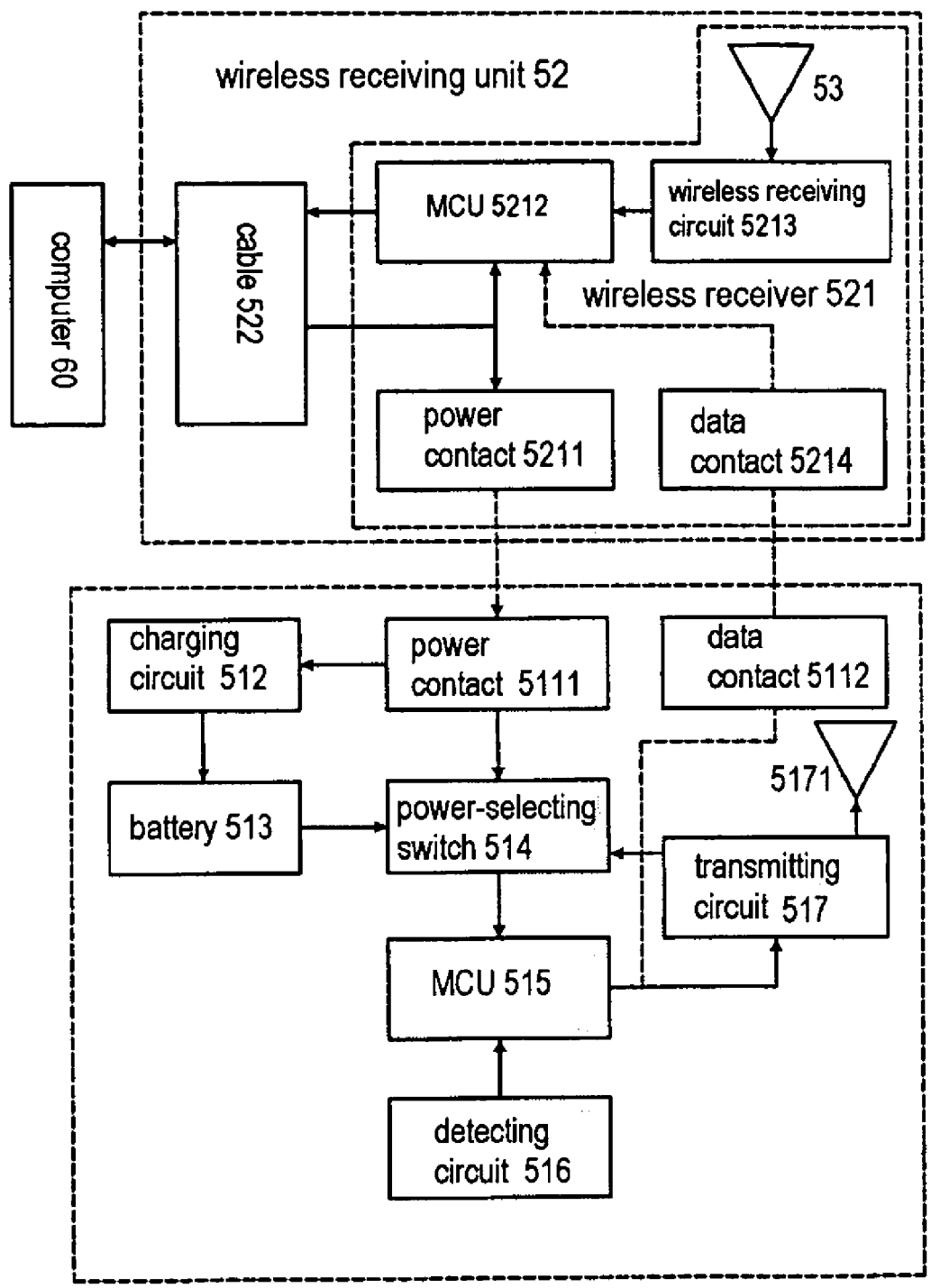
FIG. 7 is a schematic block diagram illustrating the electrical components of the body and the wireless receiving unit of the input device of FIG. 1 illustrating a modification made thereto.

FIGS. 6 and 7 illustrate a modification that can be made to the input device in FIGS. 1-3. In FIGS. 6-7, the recess 511 further includes a data contact 5112 that corresponds to a data contact 5214 on the receiver 521. The data contacts 5112 and 5214 are coupled to the MCU 515 and the MCU 5212, respectively. When the receiving unit 52 is received in the recess 511, the power contacts 5211 will engage the power contacts 5111, the data contact 5112 will engage the data contact 5214, the battery 513 can be recharged through the cable 522 (coupled to the computer 60), and the signals from the detecting circuit 516 can be transmitted to the MCU 5212 of the receiver 521 through the MCU 515 and the data contacts 5112 and 5214, all while the receiver 521 is retained within the recess 511 of the body 51. Thus, the MCU 5212 can forward the received wired signal to the computer 60 via the cable 522. As a result, the battery 513 can be recharged while the user is simultaneously operating the input device.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A rechargeable wireless input device assembly that is used with a computer, comprising:
   a cable coupled to the computer;
   a wireless receiver coupled to the computer via the cable;
   a wireless input device having a body and a battery that is retained in the body, wherein the body removably engages the wireless receiver; and
   wherein the computer delivers power through the cable and the wireless receiver to charge the battery, while the wireless input device simultaneously enables the transmission of operational signals to the wireless receiver for further transmission to the computer.

2. The assembly of claim 1, wherein the body and the wireless receiver respectively include power contacts that engage each other when the computer charges the battery.

3. The assembly of claim 2, wherein the body and the wireless receiver respectively include data contacts that engage each other.

4. The assembly of claim 2, wherein the body includes a select switch for switching the receipt of power between the power contacts in the body and the battery.

5. The assembly of claim 1, wherein the body has a recess for retaining the receiver.

6. The assembly of claim 5, wherein the recess further includes a cable retainer and a connector retainer.

7. The assembly of claim 1, wherein the cable has a first connector for coupling the computer, and a second connector for coupling the wireless receiver.

8. A method of operating a wireless input device, comprising:
   coupling a wireless receiver to a computer via a cable;
   providing a wireless input device having a body and a battery that is retained in the body;
   removably engaging the wireless receiver to a portion of the body; and
   simultaneously enabling (i) the delivery of power through the cable and the wireless receiver to charge the battery, and (ii) transmission of operational signals from the wireless input device to the wireless receiver for further transmission to the computer.

9. A method of operating an input device, comprising:
   coupling a receiver to a computer via a cable;
   providing an input device having a body and a battery that is retained in the body;
   removably engaging the receiver to a portion of the body; and
   simultaneously (i) delivering power through the cable and the receiver to charge the battery, and (ii) transmitting operational signals from the input device to the receiver for further transmission to the computer.

10. The method of claim 9, further including:
    providing power contacts in the receiver;
    providing power contacts in the body; and
    engaging the power contacts in the receiver and the body when the battery is being charged.

11. The method of claim 10, further including:
    switching the receipt of power between the power contacts in the body and the battery.

12. The method of claim 10, further including:
    providing data contacts in the receiver;
    providing data contacts in the body; and
    engaging the data contacts in the receiver and the body when the battery is being charged.

13. An assembly, comprising:
    a computer;
    a cable coupled to the computer;
    a receiver coupled to the computer via the cable, the receiver having power contacts;
    an input device having a body, power contacts, and a battery that is retained in the body, wherein the body removably engages the receiver with the power contacts of the body engaging the power contacts of the receiver, and the body including select switch for switching the receipt of power between the power contacts in the body and the battery; and
    wherein the computer delivers power through the cable and the receiver to charge the battery, while the input device simultaneously transmits operational signals to the receiver for further transmission to the computer.

14. The assembly of claim 13, wherein the body and the wireless receiver respectively include data contacts that engage each other.

15. The assembly of claim 13, wherein the body has a recess for retaining the receiver.

16. The assembly of claim 15, wherein the recess further includes a cable retainer and a connector retainer.

17. The assembly of claim 13, wherein the cable has a first connector for coupling the computer, and a second connector for coupling the wireless receiver.

* * * * *